United States Patent
Reinhardt

(10) Patent No.: US 9,579,826 B2
(45) Date of Patent: Feb. 28, 2017

(54) METHOD FOR SLICING WAFERS FROM A WORKPIECE USING A SAWING WIRE

(71) Applicant: Siltronic AG, Munich (DE)

(72) Inventor: Claudia Reinhardt, Hohnstein (DE)

(73) Assignee: SILTRONIC AG, Munich (DE)

(*) Notice: Subject to any disclaimer, the term of this patent is extended or adjusted under 35 U.S.C. 154(b) by 35 days.

(21) Appl. No.: 14/669,033

(22) Filed: Mar. 26, 2015

(65) Prior Publication Data

US 2015/0283727 A1 Oct. 8, 2015

(30) Foreign Application Priority Data

Apr. 4, 2014 (DE) .................. 10 2014 206 488
Jan. 9, 2015 (DE) .................. 10 2015 200 198

(51) Int. Cl.
*B28D 5/04* (2006.01)
*B23D 57/00* (2006.01)

(52) U.S. Cl.
CPC ......... *B28D 5/045* (2013.01); *B23D 57/0023* (2013.01)

(58) Field of Classification Search
CPC .................. B28D 5/045; B23D 57/0023
USPC ....................................................... 125/21
See application file for complete search history.

(56) References Cited

U.S. PATENT DOCUMENTS

| | | | | |
|---|---|---|---|---|
| 4,884,758 A | * | 12/1989 | Hamkins | H01F 41/08 242/437.1 |
| 5,269,285 A | * | 12/1993 | Toyama | B23D 57/0053 125/16.01 |
| 5,771,876 A | | 6/1998 | Egglhuber | |
| 5,829,424 A | * | 11/1998 | Hauser | B28D 5/045 125/16.01 |
| 6,065,461 A | * | 5/2000 | Asakawa | B28D 5/007 125/16.02 |
| 6,390,896 B1 | | 5/2002 | Huber et al. | |
| 9,314,942 B2 | * | 4/2016 | Nishino | B28D 5/0076 |
| 9,352,404 B2 | * | 5/2016 | Song | B23D 65/00 |
| 2003/0034022 A1 | * | 2/2003 | Egglhuber | B28D 5/045 125/21 |
| 2004/0097174 A1 | | 5/2004 | Shirakashi et al. | |
| 2005/0183713 A1 | | 8/2005 | Takeuchi et al. | |
| 2014/0038050 A1 | | 2/2014 | Nakanishi et al. | |
| 2015/0183132 A1 | | 7/2015 | Kondo et al. | |

FOREIGN PATENT DOCUMENTS

| | | |
|---|---|---|
| CN | 1503332 A | 6/2004 |
| CN | 202155964 U | 3/2012 |
| DE | 10237247 A1 | 3/2004 |
| DE | 102007019566 B4 | 10/2008 |
| DE | 102010005718 A1 | 7/2011 |

(Continued)

*Primary Examiner* — George Nguyen
(74) *Attorney, Agent, or Firm* — Leydig, Voit & Mayer, Ltd.

(57) ABSTRACT

A method for slicing wafers from a workpiece using a sawing wire, wherein at least two wire guide rolls clamp a wire web, each wire guide roll having a multiplicity of grooves in its lateral surface, wherein at least one groove in which no wire is inserted during the wire sawing is present alongside a wire-guiding groove and, after wear on the wire-guiding grooves or after a defined number of sawing processes, the sawing wire is wound over into the previously unoccupied grooves that are not yet worn or used, respectively.

20 Claims, 2 Drawing Sheets

(56) References Cited

FOREIGN PATENT DOCUMENTS

| | | |
|---|---|---|
| EP | 0990498 A1 | 4/2000 |
| JP | 51137991 A | 11/1976 |
| JP | 2000309015 A | 11/2000 |
| JP | 2006102917 A | 4/2006 |
| KR | 102004003901 A | 10/2002 |
| WO | WO 2014034841 A1 | 3/2014 |

* cited by examiner

METHOD FOR SLICING WAFERS FROM A WORKPIECE USING A SAWING WIRE

CROSS-REFERENCE TO PRIOR APPLICATIONS

Priority is claimed to German Patent Applications No. DE102014206488.0 filed Apr. 4, 2014, and DE102015200198.9 filed Jan. 9, 2015, the entire disclosure of each of which is incorporated by reference herein.

FIELD

The invention relates to a method for slicing wafers from a workpiece using a sawing wire, wherein at least two wire guide rolls clamp a wire web.

BACKGROUND

For electronics, microelectronics and microelectromechanics, semiconductor wafers with extreme requirements made of global and local flatness, single-side-referenced local flatness (nanotopology), roughness and cleanness are required as starting materials (substrates). Semiconductor wafers are wafers composed of semiconductor materials, more particularly compound semiconductors such as gallium arsenide and predominantly elemental semiconductors such as silicon and occasionally germanium.

In methods of the art, semiconductor wafers are produced in a multiplicity of successive process steps, wherein, in the first step, by way of example, a single crystal (rod) composed of semiconductor material is pulled by means of the Czochralski method or a polycrystalline block composed of semiconductor material is cast, and, in a further step, the resulting circular-cylindrical or block-shaped workpiece composed of semiconductor material ("ingot") is separated into individual semiconductor wafers by means of wire saws.

In this case, a distinction is made between single-cut wire saws and multiple wire saws, designated hereinafter as MW saws (MW=multiple wire). MW saws are used, in particular, when a workpiece, for example a rod composed of semiconductor material, is intended to be sawn into a multiplicity of wafers in one work step.

U.S. Pat. No. 5,771,876 describes the functional principle of a wire saw suitable for producing semiconductor wafers. The essential components of these wire saws include a machine frame, a feed device and a sawing tool consisting of a web ("wire web") composed of parallel wire sections.

An MW saw is disclosed in EP 990 498 A1, for example. In this case, a long sawing wire coated with bonded abrasive grain runs spirally over wire spools and forms one or more wire webs.

In general, the wire web is formed from a multiplicity of parallel wire sections which are clamped between at least two wire guide rolls, wherein the wire guide rolls are mounted in rotatable fashion and at least one of them is driven. The wire guide rolls are usually provided with a coating, for example polyurethane. In accordance with DE 10 2007 019 566 B4 and DE 10 2010 005 718 A1, a multiplicity of grooves for guiding the sawing wire are cut into the coating of the wire guide roll, wherein all the grooves have a curved groove base and groove flanks with a specific opening angle.

The longitudinal axes of the wire guide rolls are generally oriented perpendicularly to the sawing wire in the wire web.

The production of wafers composed of semiconductor material makes particularly stringent requirements of the precision of the slicing process. For this purpose, it is important that the multiplicity of grooves on the wire guide roll in which the sawing wire is guided run exactly parallel and the grooves and the sawing wire lie in one line (alignment).

In accordance with DE 102 37 247 A1, the distance between two grooves on the wire guide roll can be identical or decrease from the wire inlet side to the wire outlet side. The reduction of the distance between the grooves takes account of the circumstance that the diameter of the wire decreases during the sawing process, such that as a result of the reduced distance between grooves, despite a thinner sawing wire, wafers of uniform thickness are sliced from the workpiece.

As a result of the continuous contact with the sawing wire, the coating of the wire guide rolls and the grooves cut into the coating are subject to wear and have to be regularly renewed in order to avoid so-called alignment errors. Alignment errors, for example if the groove of the wire guide roll and the wire lying in said groove no longer lie on a straight line, can lead to damage, for example saw marks or grooves, on the surfaces of the sliced semiconductor wafers.

If the grooves of the wire guide roll are worn, they have to be renewed. For this purpose, generally the wire guide roll has to be demounted from the wire saw and it is necessary to introduce a new coating and/or new grooves into the surface of the coating of the wire guide roll (grooving of the wire guide roll). This work that has to be carried out regularly leads to outage times of the wire saw and thus restricts the economic viability of the method.

It is therefore desirable to lengthen the period of time between the renewal of worn grooves, i.e. grooving the wire guide roll. This can be done for example by coating the wire guide roll with a suitable material.

Wire guide rolls having a coating composed of polyurethane (PU) are usually used. Polyurethanes are largely resistant to the liquid abrasive medium (slurry) containing loose solids (abrasives) or to abrasion on account of sawing wires having bonded grain.

However, the coating of the wire guide roll must be neither too soft nor too hard. In the case of a material that is too soft, the coating is not sufficiently resistant to the plastic deformation of the grooves, thus resulting in an undesirable alteration of the groove geometry. In the case of a material that is too hard, the frictional engagement between wire and wire guide roll can no longer be ensured, as a result of which the wire web can no longer be optimally set in motion.

In order to reduce the wear of the coating of a wire guide roll, JP 2006102917 A2 proposes a coating in the form of urethane comprising 5 to 30 percent by weight of silicon carbide grain, such that the coating is significantly harder than just a coating consisting of urethane.

Although a harder coating lengthens the period of time between the renewal of worn grooves, it has the disadvantages mentioned above.

SUMMARY

An aspect of the invention provides a method for slicing a wafer from a workpiece using a sawing wire, the method comprising: forming a wire web with the sawing wire, the wire web comprising a multiplicity of wire sections arranged parallel, and the wire web being clamped at least by two wire guide rolls; and guiding the sawing wire by the at least two wire guide rolls through wire-guiding grooves, the wire-guiding grooves having a distance A between each another, in two lateral surfaces, wherein at least one further groove, in which no wire is inserted during the wire sawing, is present alongside a wire-guiding groove.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
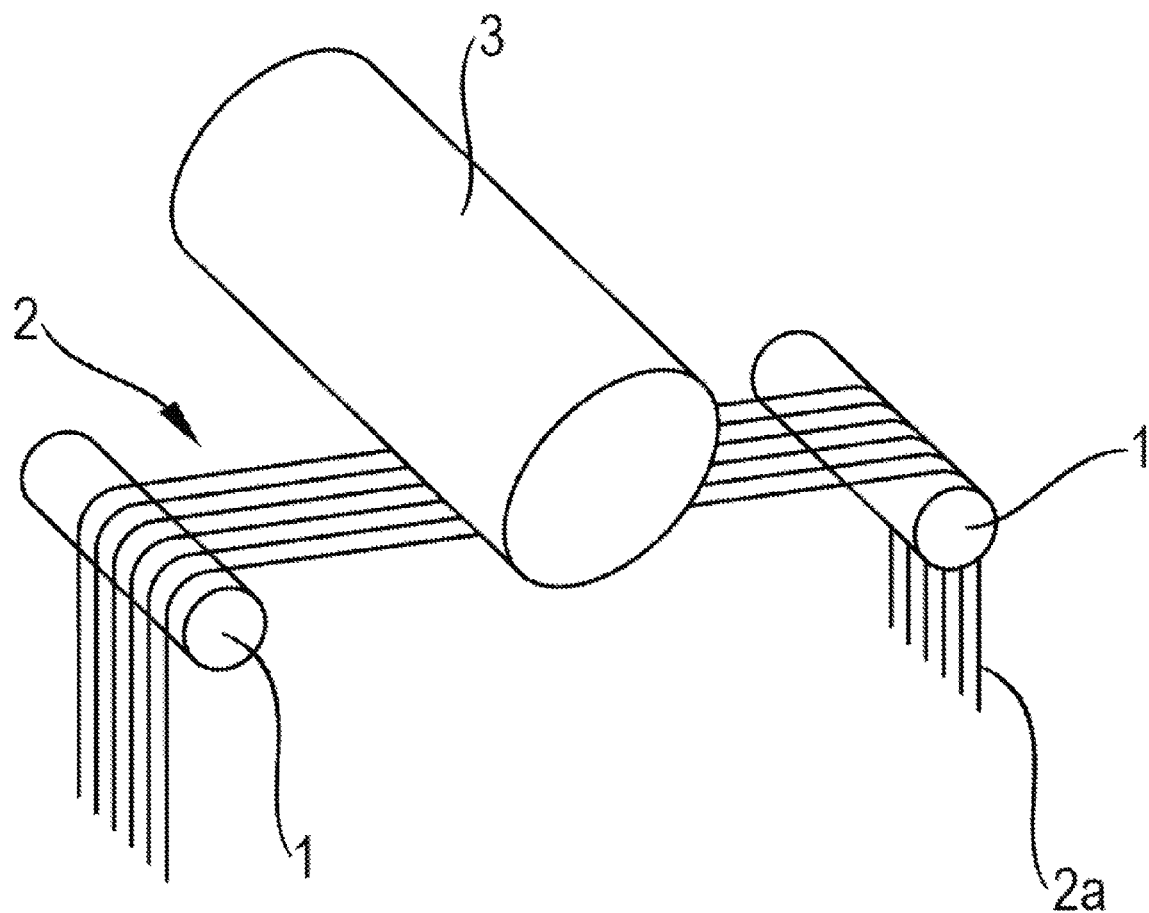
FIG. 1 shows a wire saw in accordance with the prior art.

An aspect of the invention provides a method for slicing wafers from a workpiece using a sawing wire, wherein at least two wire guide rolls clamp a wire web. Each wire guide roll has a multiplicity of grooves in its lateral surface, wherein at least one groove in which no wire is inserted during the wire sawing is present alongside a wire-guiding groove and, after the wear of the wire-guiding grooves or after a defined number of sawing processes, the sawing wire is wound over into the previously unoccupied grooves that are not yet worn or used, respectively.

An aspect of the invention provides a method for slicing a multiplicity of wafers from a workpiece by means of a wire saw, wherein the period of time between the renewal of worn grooves of the wire guide rolls is lengthened and the outage times of the wire saw are thus reduced, without having the disadvantages of a material that is too hard for the coating.

An aspect of the invention provides a method for slicing wafers from a workpiece 3 by means of a sawing wire 2a, wherein the sawing wire 2a forms a wire web 2 comprising a multiplicity of wire sections arranged parallel, said wire web being clamped at least by two wire guide rolls 1, the sawing wire 2a is guided by the at least two wire guide rolls 1 through grooves 4, which have a distance A among one another, in the two lateral surfaces, characterized in that at least one groove 4a in which no wire 2a is inserted during the wire sawing is present alongside a wire-guiding groove 4.

FIG. 1 shows a wire saw in accordance with the prior art, comprising two wire guide rolls 1, between which runs a wire web 2 formed from wire sections running parallel, said wire web sawing into a workpiece 3 fixed to a workpiece receptacle (not depicted). For reasons of clarity, the wire saw is illustrated in a greatly simplified manner and, for example, without deflection rolls.

Figure 2A:
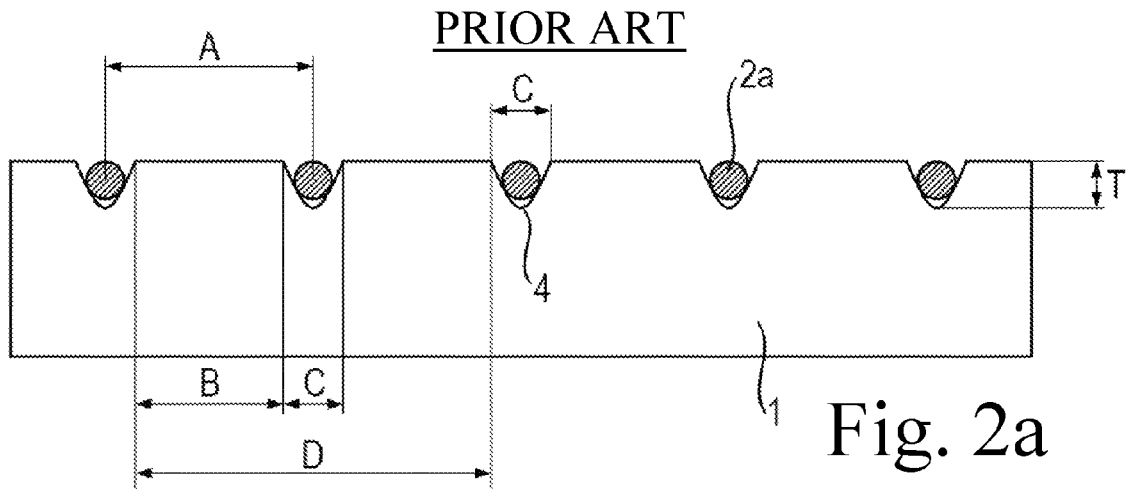
FIGS. 2a, 2b, and 2c show inventive embodiments of a wire saw method.
Figure 2B:
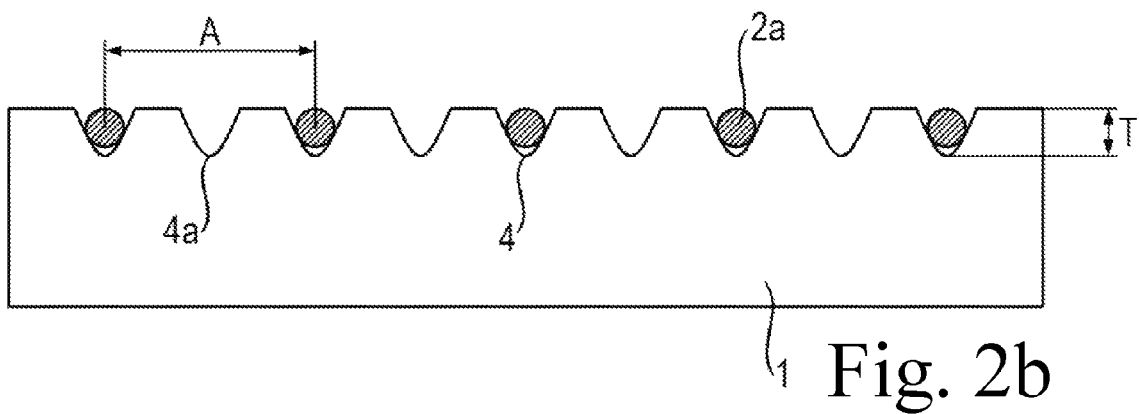
Figure 2C:
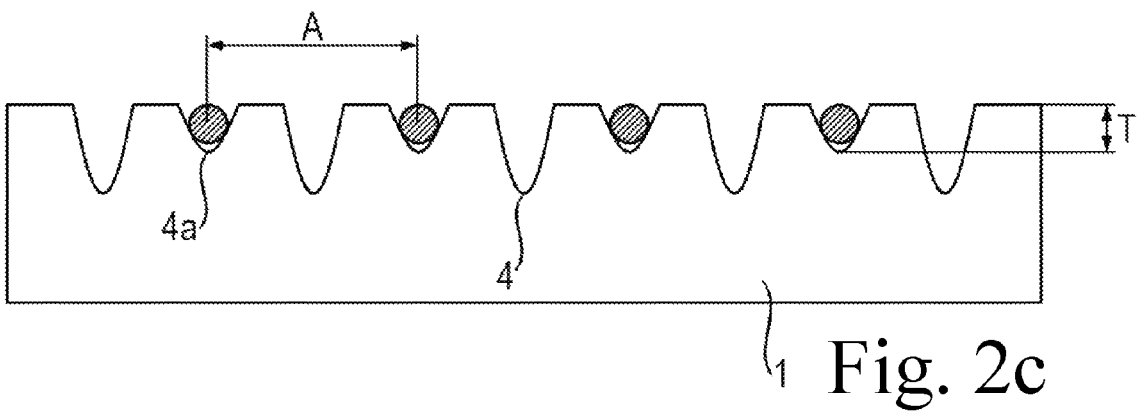

FIG. 2 shows the cross section of a wire guide roll 1 having grooves 4 with the distance A, said grooves having a width C (curf loss) and a depth T. In accordance with the prior art, a wire 2a is inserted in each groove 4 (FIG. 2a). In the case of the wire guide roll according to the invention, in the first life cycle of the wire guide roll, only every n-th groove (n≥2) is occupied by a wire 2a (FIG. 2b). If the grooves 4 occupied by wire 2a are for example worn (end of the first life cycle, illustrated as deepened recess in FIG. 2c), the wire 2a is inserted into the adjacent, as yet unused groove 4a (FIG. 2c). In FIG. 2, the grooves 4 and respectively 4a have a constant distance A by way of example, whereby A is the sum of the inner distance B between two grooves 4 and the width (curve loss) C of a groove 4, i.e. A=B+C (equation (1)), and D is the inner distance between a first groove 4 and an n+2 groove 4, whereby n is the number of the first groove 4. In FIG. 2a, D is the inner distance between the first and the third groove 4 and is defined as D=2×B+C (equation (2)).

The method for slicing a multiplicity of wafers from a workpiece 3 by means of a wire saw using the wire guide roll according to the invention can be implemented in any wire saw in which the sawing wire 2a is guided via grooved wire guide rolls 1.

A wire guide roll 1 is a generally circular-cylindrical roll which is mounted axially rotatably about a roll core, with a casing having an outer lateral surface, in which the grooves 4 for the wire guide are cut, and two side surfaces. The length of the wire guide length preferably corresponds to the length of wire guide rolls in accordance with the prior art.

The sawing wire 2a is wound from a supply spool (dispenser roll) via a wire web 2 clamped by at least two wire guide rolls 1, said wire web comprising a multiplicity of wire sections arranged parallel to one another, onto a receiver spool (take-up roll). During the sawing process, the sawing wire 2a can be wound only in one direction or with a periodic change of direction (pilgrim step method).

In a first embodiment, the wire guide roll 1 consists only of a single material, i.e. the lateral surface of the wire guide roll 1 consists of the same material as the roll core of the wire guide roll 1.

In the first embodiment, the wire guide roll 1 preferably consists of a polyester-based or polyether-based polyurethane, as disclosed for example in DE 10 2007 019 566 B4. In this embodiment, the casing of the wire guide roll 1 is formed by a non-delimitable layer thickness between the lateral surface, that surface of the wire guide roll 1 which runs in the direction of the longitudinal axis, and the roll core.

In a second embodiment, the roll core of the wire guide roll 1 consists of a first material, preferably of steel, aluminum or a composite material, for example glass-fiber- or carbon-fiber-reinforced plastics, and the casing of the wire guide roll 1 consists of a second material, which can be identical to or different than the first material. The second material encloses, at least longitudinally, the first material with the thickness M. The thickness M of the casing is preferably between 0.5 and 50 mm, particularly preferably between 3 and 25 mm.

In the second embodiment, the roll core is covered or coated with the second material. The covering or the coating can be fixedly connected to the roll core, for example by adhesive bonding, or can be embodied in the form of a removable cover connected to the roll core via lateral clamping rings, for example.

In the second embodiment, the casing (covering, coating) of the wire guide roll 1 preferably consists of a polyester-based or polyether-based polyurethane, as disclosed in DE 10 2007 019 566 B4, for example, and of copolymers and is admixed if appropriate with admixtures.

Hereinafter, the term casing is used independently of whether or not the roll core has an outer coating which consists of a second material and which is delimitable toward the roll core.

The grooves 4 cut into the casing in each case with a distance A serve for guiding the sawing wire, that is to say that the sawing wire lies in the grooves 4. The grooves 4 of a wire guide roll 1 are preferably of identical depth T. The depth T of the grooves 4 is preferably in a range of 50 to 1500 μm.

The width C of the individual grooves 4 is preferably identical. A continuous reduction of the width C of the grooves 4 from the wire inlet side to the wire outlet side is likewise preferred, in order to ensure an optimum guidance of the sawing wire 2a, the diameter of which decreases as a result of wear during the penetration of the wire sections of the wire web 2 through the workpiece 3.

The grooves 4 are preferably positioned identically on the two wire guide rolls 1, which are situated opposite one another in a horizontal plane, such that the sawing wire subsequently guided in the groove 4 runs orthogonally relative to the respective rotation axes of the wire guide rolls 1. A perpendicular—in relation to the longitudinal axis of the workpiece 3 to be sawn—cutting of the wire web 2 into the workpiece 3 is thus also ensured.

The grooves 4 for subsequent wire guidance are preferably introduced into the casing of the wire guide rolls 1 mechanically, particularly preferably optically by means of a laser.

In the case of a wire guide roll 1 in accordance with the prior art, each groove 4 in the casing is occupied by a sawing wire, wherein the grooves 4 are at a distance A (pitch) from one another, measured from groove center to groove center. In the case of the wire guide roll 1 according to the invention, only every n-th groove 4 (n≥2) is occupied by a wire, such that at least one groove 4a not occupied by a wire 2a is present between two grooves 4 which are occupied by a wire 2a and which are at a distance A from one another.

The distance A between two grooves 4 occupied by a wire is substantially determined by the target thickness of the wafers to be sliced from a workpiece 3, the sawing slurry used, and by the diameter (thickness) of the wire 2a. The distance A between two grooves 4 occupied by a wire 2a can be variable or constant (fixed pitch) for the purpose of compensating for the wear of the wire—the wire thickness decreases during wire sawing from the wire inlet side to the wire outlet side of the wire web 2.

In order that the length of the wire guide roll 1 according to the invention does not change in comparison with a wire guide roll 1 in accordance with the prior art, in each case between two grooves 4 occupied by a wire 2a in the wire guide roll 1 according to the invention at least one new groove 4a which is initially not occupied by wire 2a is introduced into the casing (FIGS. 2a and 2b).

If, for example, the distance A between two grooves 4 in a wire guide roll 1 which are occupied by a wire 2a in accordance with the prior art is 1500 μm, and if the number of usable grooves is intended to be doubled (double grooving), in the guide roll 1 according to the invention a new groove 4a is cut in between two grooves 4 in each case, the distance A' between the groove 4 and the groove 4a decreasing to 1500/2=750 μm (FIG. 2b).

The minimum inner distance B between a groove 4 occupied by a wire 2a and a groove 4a not occupied by a wire 2a is determined by the diameter of the unused sawing wire 2a and by the material of which the casing consists, since the groove 4 must have a sufficient lateral stability in order to be able to stably guide the sawing wire 2a during the wire sawing process.

The distance A (respectively the inner distance B) between two grooves 4 occupied by a wire 2a is preferably identical over the entire length of the casing. Distance A (respectively the inner distance B) between two grooves 4 likewise preferably decreases from the wire inlet side to the wire outlet side.

In order to ensure a perpendicular cutting of the wire web 2 into the workpiece 3, when the wire guide rolls 1 according to the invention are used in a wire saw for slicing wafers from a workpiece 3, i.e. the sawing process, the grooves 4 of the wire guide rolls 1 clamping the wire web are to be occupied identically.

If, in the case of a wire guide roll 1, for example, the first, the third, the fifth, etc. groove 4 are occupied by a wire 2a, then the corresponding first, third, fifth, etc. groove 4 of the at least second wire guide roll 1 are also to be occupied by the wire 2a.

If the wire sawing process is started with this wire occupancy of the grooves 4, the grooves 4 occupied by the wire 2a wear in the course of the sawing process or the sawing processes. If the grooves 4 occupied by the wire 2a are worn, the life cycle of said grooves 4 is ended.

The sawing wire 2a is then spooled over from the worn groove 4 into the adjacent groove 4a not previously occupied by a sawing wire 2a, such that the wire sawing process can be continued with unused grooves 4a on the same wire guide roll 1. The distance A between the unused grooves 4a preferably corresponds to the distance A between the grooves 4 worn in the previous sawing process.

It is also preferred to start with the wire occupancy of the wire guide roll 1 according to the invention, where for example the first, the third, the fifth, etc. groove 4 are occupied by a wire 2a, then the corresponding first, third, fifth, etc. groove 4 of the at least second wire guide roll 1 are also occupied by the wire 2a. After a first defined number of sawing processes, e.g. 20 times, the sawing wire 2a is then spooled over from the now used grooves 4 into the adjacent grooves 4a not previously occupied by a sawing wire 2a (e.g. the second, the fourth, the sixth, etc. groove 4), such that the wire sawing process can be continued with unused grooves 4a on the same wire guide roll 1.

After a second defined number of sawing processes, e.g. 20 times, the sawing wire 2a is then spooled over from the used second, fourth, sixth, etc. groove 4 back into the previously used first, third, fifth, etc. groove 4. Again after a certain number of sawing processes, the sawing wire 2a is spooled over into the second, the fourth, the sixth, etc. groove 4, and so on. The periodic change of the grooves 4 occupied by the sawing wire 2a after a certain number of sawing processes results in a continuous wear of all groves 4.

Preferably, the first and the second defined numbers of sawing processes are the same and in the range of 10 to 50 sawing processes. It is also preferred, that the first and the second defined numbers of sawing processes during which one set of grooves 4 is used, is not the same; for instance, the first defined number of sawing processes is 10 and the second defined number of sawing processes is 20.

Spooling the wire web 2 over into the closest groove combination, that is to say the groove 4a respectively adjacent to the worn groove 4 and as yet unused, preferably takes place manually analogously to the mounting of a wire web 2 in accordance with the prior art. Spooling the sawing wire 2a over automatically is likewise preferred.

If, for example, only every second groove 4 and respectively 4a is occupied by a sawing wire 2a (n=2), the period of usability of the wire guide roll 1 is doubled, since said wire guide roll has to be exchanged or regrooved only after the wear of the grooves 4a newly occupied by sawing wire.

If only every third groove 4 (n=3) is occupied by a sawing wire 2a at the start of the use of the wire guide roll according to the invention, the duration of use of the wire guide roll 1 is tripled, since, after the wear of the grooves 4, two new, unused grooves 4a are still available for subsequent sawing processes.

The wire guide roll 1 according to the invention is also suitable for slicing a multiplicity of wafers from workpieces 3 with different thicknesses of the sliced wafers, without the wire guide roll having to be demounted from the wire saw.

If the inner distance D between two adjacent grooves 4 in the casing of the wire guide roll 1 is chosen, for example, such that wafers having a thickness of 750 μm, i.e. the inner distance B between two grooves 4 is also 750 μm, can be sawn from a first workpiece 3, wafers having at thickness of e.g. 1750 μm, can subsequently be sawn from a second workpiece 3 by virtue of the sawing wire being spooled over into every second groove 4, i.e. there is a free groove 4 between every groove 4 occupied by a sawing wire. The thickness of 1750 μm given as example is based on an inner distance B between two adjacent groves 4 of 750 μm and a curf loss (width of the grooves 4) C of 250 μm, calculated with the equation (2), i.e. $D=2 \times B+C=2 \times 750$ μm+250 μm=1750 μm.

The geometry (depth and width) of all the grooves 4 and respectively 4a of the wire guide roll 1 according to the invention is preferably identical.

Particularly preferably, the geometry of the groove 4 and respectively 4a each respectively occupied by a wire 2a is adapted to the wear of the sawing wire 2a. In this regard, by way of example, the width of the groove 4a not yet occupied by a sawing wire 2a can be somewhat less than the width of the groove 4 occupied by a wire 2a in the first life cycle of the wire guide roll, since the diameter of the sawing wire 2a decreases as a result of wear during wire sawing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method for slicing a wafer from a workpiece using a sawing wire, the method comprising:
   forming a wire web with the sawing wire, the wire web comprising a multiplicity of wire sections arranged parallel, and the wire web being clamped at least by two wire guide rolls, a wire inlet side roll and a wire outlet side roll; and
   guiding the sawing wire by the at least two wire guide rolls through wire-guiding grooves, the wire-guiding grooves having a distance A between each another, in two lateral surfaces, an each groove having a width C,
   wherein at least one further groove, in which no wire is inserted during the wire sawing, is present alongside a wire-guiding groove, and
   wherein the width C of the wire-guiding grooves and the further groove decreases from the wire inlet side roll to the wire outlet side roll.

2. The method of claim 1, wherein the distance A between two wire-guiding grooves is constant over an entire length of the wire guide roll.

3. The method of claim 1, wherein the distance A between two wire-guiding grooves decreases from a wire inlet side to a wire outlet side.

4. The method of claim 1, further comprising:
   winding the sawing wire over into a closest adjacent groove not yet guiding a sawing wire, once the wire-guiding grooves are worn.

5. The method of claim 1, further comprising:
   periodically winding the sawing wire over into a closest adjacent groove not yet guiding a sawing wire, once the wire-guiding grooves are used for a first defined number of sawing processes; and
   winding the sawing wire back into previously used wire-guiding grooves, after a second defined number of sawing processes.

6. The method of claim 1, wherein wire guide roll comprises a polyurethane comprising a polyester.

7. The method of claim 1, wherein wire guide roll comprises a polyurethane comprising a polyether.

8. The method of claim 1, wherein a depth T of the wire-guiding grooves is in a range of from 50 to 1500 μm.

9. The method of claim 1, further comprising:
   introducing the wire-guiding grooves for subsequent wire guidance into a casing of the wire guide rolls mechanically.

10. The method of claim 1, further comprising:
    introducing the wire-guiding grooves for subsequent wire guidance into a casing of the wire guide rolls optically.

11. The method of claim 1, further comprising:
    introducing the wire-guiding grooves for subsequent wire guidance into a casing of the wire guide rolls using a laser.

12. The method of claim 1, wherein every n-th groove is occupied by a wire, n being at least two.

13. The method of claim 1, wherein every second groove is occupied by a wire.

14. The method of claim 1, wherein every third groove is occupied by a wire.

15. The method of claim 1, wherein the grooves have identical depth.

16. The method of claim 1, wherein the distance A between two wire-guiding grooves decreases from a wire inlet side to a wire outlet side, and
    wherein the distance decreases in a range of from above 0 to 750 μm.

17. The method of claim 1, wherein the wire guide roll includes (i) a core including a first material, and (ii) a casing including a second material.

18. The method of claim 17, wherein the first material is identical to the second material.

19. The method of claim 17, wherein the first material is different than the second material.

20. The method of claim 17, wherein the casing has a thickness in a range of from 0.5 to 50 mm.

* * * * *